United States Patent
Hesse et al.

(10) Patent No.: US 11,667,569 B2
(45) Date of Patent: Jun. 6, 2023

(54) COMPOSITION CONTAINING A SEMI-ORDERED CALCIUM SILICATE HYDRATE

(71) Applicant: BASF SE, Ludwigshafen am Rhein (DE)

(72) Inventors: Christoph Hesse, Trostberg (DE); Michael Dietzsch, Ludwigshafen am Rhein (DE); Attila Dal, Haltern am See (DE); Maria Becker, Haltern am See (DE)

(73) Assignee: BASF SE

( * ) Notice: Subject to any disclaimer, the term of this patent is extended or adjusted under 35 U.S.C. 154(b) by 199 days.

(21) Appl. No.: 16/487,702

(22) PCT Filed: Feb. 22, 2018

(86) PCT No.: PCT/EP2018/054430
§ 371 (c)(1),
(2) Date: Aug. 21, 2019

(87) PCT Pub. No.: WO2018/154012
PCT Pub. Date: Aug. 30, 2018

(65) Prior Publication Data
US 2020/0231499 A1 Jul. 23, 2020

(30) Foreign Application Priority Data
Feb. 22, 2017 (EP) .................................. 17157418

(51) Int. Cl.
C04B 14/04 (2006.01)
C04B 28/18 (2006.01)
(Continued)

(52) U.S. Cl.
CPC .......... *C04B 14/043* (2013.01); *C04B 20/002* (2013.01); *C04B 22/00* (2013.01);
(Continued)

(58) Field of Classification Search
CPC . C04B 14/043; C04B 28/188; C04B 2103/14; C04B 2103/408; C04B 22/0086;
(Continued)

(56) References Cited

U.S. PATENT DOCUMENTS 5,709,743 A * 1/1998 Leture ................. C04B 22/0086
106/713
10,144,673 B2 12/2018 Bichler et al.
(Continued)

FOREIGN PATENT DOCUMENTS

EP 0 753 488 A2 1/1997
EP 0 894 811 A1 2/1999
(Continued)

OTHER PUBLICATIONS

Grangeon, S., Claret, F., Linard, Y. & Chiaberge, C. "X-ray diffraction: a powerful tool to probe and understand the structure of nanocrystalline calcium silicate hydrates", (2013). Acta Cryst. B69, 465-473. doi:10.1107/S2052519213021155 (Year: 2013).*
(Continued)

*Primary Examiner* — Kevin E Yoon
*Assistant Examiner* — Marites A Guino-O Uzzle
(74) *Attorney, Agent, or Firm* — Faegre Drinker Biddle & Reath LLP

(57) ABSTRACT

A curing accelerator composition for building chemical mixtures comprises a mineral constituent and a polymeric water-soluble dispersant. The mineral constituent comprises a semi-ordered calcium silicate hydrate having an apparent crystallite size of 15 nm or less and less than 35% by weight of crystalline phases other than the semi-ordered calcium silicate hydrate. The composition displays a more pronounced accelerating effect than comparative compositions in which the mineral component comprises a calcium silicate hydrate having a higher degree of crystallinity.

17 Claims, 2 Drawing Sheets

Figure 1:
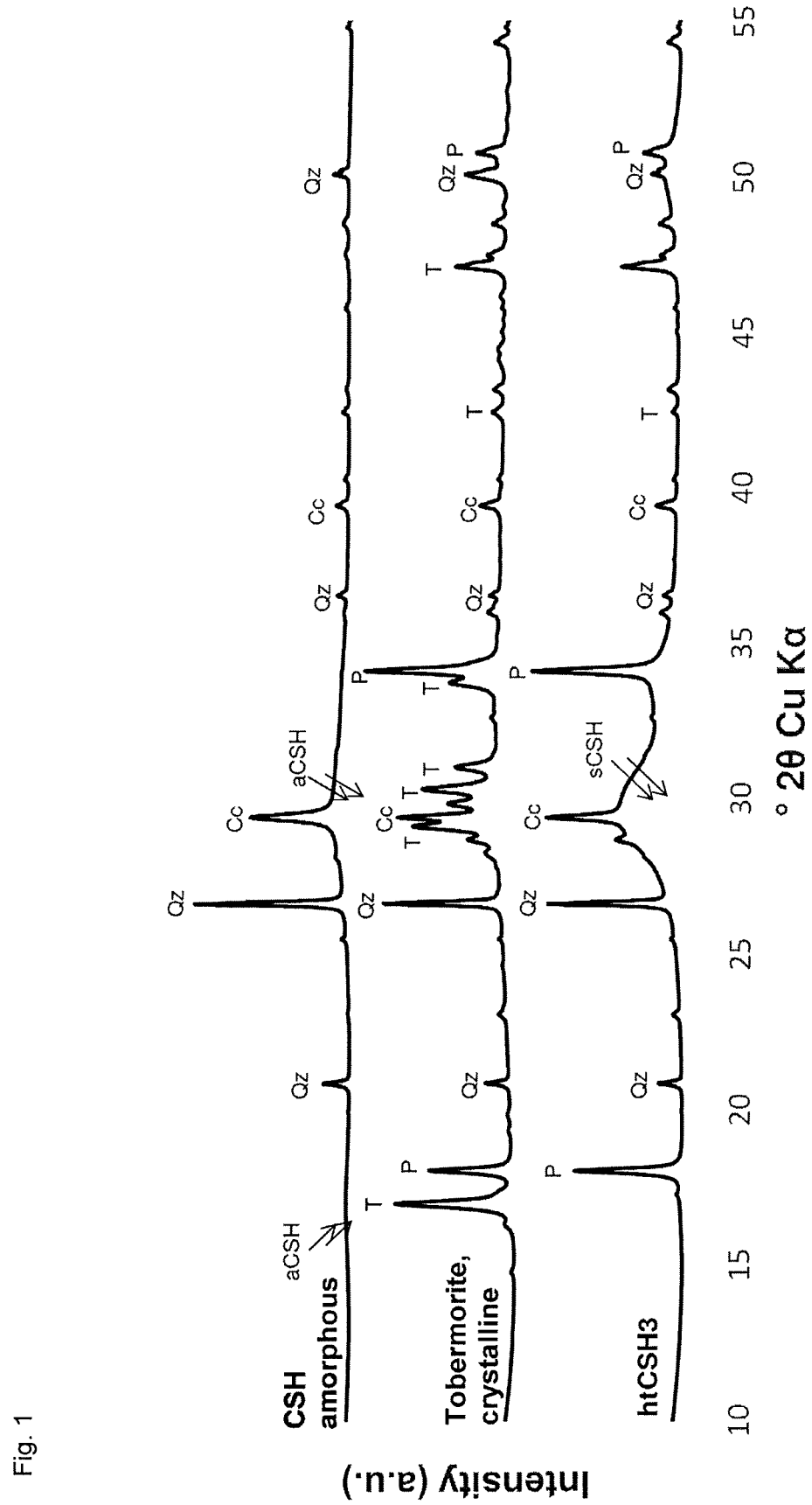

(51) Int. Cl.
| | |
|---|---|
| *C04B 22/00* | (2006.01) |
| *C04B 28/02* | (2006.01) |
| *C04B 20/00* | (2006.01) |
| *C04B 22/06* | (2006.01) |
| *C04B 40/00* | (2006.01) |
| C04B 103/14 | (2006.01) |
| C04B 103/40 | (2006.01) |
| C04B 103/00 | (2006.01) |
| C04B 103/10 | (2006.01) |

(52) U.S. Cl.
CPC ...... *C04B 22/00863* (2021.05); *C04B 22/064* (2013.01); *C04B 28/02* (2013.01); *C04B 28/188* (2013.01); *C04B 40/00* (2013.01); C04B 2103/006 (2013.01); C04B 2103/10 (2013.01); C04B 2103/14 (2013.01); C04B 2103/408 (2013.01)

(58) Field of Classification Search
CPC .......... C04B 28/02; C04B 22/00; C04B 7/02; C04B 14/04; C04B 40/02; C04B 24/32; C04B 40/0042; C04B 40/024; C04B 7/32; C04B 7/323; C04B 14/06; C04B 14/106; C04B 14/108; C04B 18/08; C04B 18/141; C04B 2103/0088; C04B 22/00863; C04B 22/064; C04B 20/002; C04B 40/005; C04B 28/065; C04B 2103/006; C04B 2103/10; C04B 28/18; C04B 40/00; Y02W 30/91; C01B 33/24
See application file for complete search history.

(56) References Cited

U.S. PATENT DOCUMENTS

| | | | | |
|---|---|---|---|---|
| 2011/0203486 | A1* | 8/2011 | Nicoleau | ............. C04B 40/0042 106/696 |
| 2011/0269875 | A1* | 11/2011 | Nicoleau | ............. C04B 40/0042 524/2 |
| 2014/0174325 | A1 | 6/2014 | Pardal et al. | |
| 2014/0331899 | A1 | 11/2014 | Wombacher et al. | |
| 2016/0318802 | A1 | 11/2016 | Ferrari et al. | |

FOREIGN PATENT DOCUMENTS

| | | |
|---|---|---|
| EP | 1 851 256 A1 | 11/2007 |
| EP | 2 243 754 A1 | 10/2010 |
| EP | 2 463 314 A1 | 6/2012 |
| EP | 2 607 329 A1 | 6/2013 |
| EP | 2 801 558 A1 | 11/2014 |
| EP | 2 801 559 A1 | 11/2014 |
| EP | 2 801 557 B9 | 1/2016 |
| WO | WO 95/04007 A1 | 2/1995 |
| WO | WO 2006/042709 A1 | 4/2006 |
| WO | WO 2006/089759 A1 | 8/2006 |
| WO | WO 2010/026155 A1 | 3/2010 |
| WO | WO 2013/017391 A1 | 2/2013 |
| WO | WO 2014/026938 A1 | 2/2014 |
| WO | WO 2015/086453 A1 | 6/2015 |
| WO | WO 2015/091461 A1 | 6/2015 |
| WO | WO 2016/192745 A1 | 12/2016 |
| WO | WO-2016192745 A1 * | 12/2016 ............. C01B 33/24 |
| WO | WO 2017/032719 A1 | 3/2017 |

OTHER PUBLICATIONS

Mikhail, R. Sh., Kamel, A. M., Abo-El-Enein, A. A. "Surface properties of cement hydration products. I. Pore structure of calcium silicate hydrates prepared in a suspension form" (1969), J. appl. Chem., 19, 324-328. doi: 10.1002/jctb.5010191105 (Year: 1969).*

K. Baltakys, E. Prichockiene Influence of CaO reactivity on the formation of low-base calcium silicate hydrates Materials Science (0137-1339). 2010, vol. 28 Issue 1, p. 295-304. [Retrieved Sep. 14, 2021 <URL: http://citeseerx.ist.psu.edu/viewdoc/download?doi=10.1.1.606.6181&rep=rep1&type=pdf>] (Year: 2010).*

Wieslawa Nocuń-Wczelik, Effect of some inorganic admixtures on the formation and properties of calcium silicate hydrates produced in hydrothermal conditions, Cement and Concrete Research, vol. 27, Issue 1, 1997, pp. 83-92. DOI: 10.1016/S0008-8846(96)00191-3 (Year: 1997).*

Zeng et al., Synthesis and Characterization of Different Crystalline Calcium Silicate Hydrate: Application of the Removal of Aflatoxin B1 from Aqueous Solution, Mar. 17, 2014, Journal of Nanomaterials, Hindawi Pub Corp, 1-10, vol. 2014, Article ID 431925 (cited in the IDS dated Jun. 28, 2021) (Year: 2014).*

Minoru Shiraishi, Michio Inagaki, Ch 10—X-ray Diffraction Methods to Study Crystallite Size and Lattice Constants of Carbon Materials,Carbon Alloys, Elsevier Science, 2003, ISBN 9780080441634, DOI:10.1016/B978-008044163-4/50010-3 (Year: 2003).*

M. Bauchy, M. J. Abdolhosseini Qomi, F.-J. Ulm, and R. J.-M. Pellenq, "Order and disorder in calcium-silicate-hydrate", J. Chem. Phys. 140, 214503 (2014). DOI:10.1063/1.4878656 (Year: 2014).*

F. Hannawayya, Study of the structure and crystallization properties of β-dicalcium silicate (β-C2S) hydrate, Materials Science and Engineering, 34, 2 (1978) pp. 183-197. DOI:10.1016/0025-5416(78)90049-6 (Year: 1978).*

H. Matsuyama, and J. F. Young, Effects of pH on precipitation of quasi-crystalline calcium silicate hydrate in aqueous solution, Advances in Cement Research, 12, 1 (2000) pp. 29-33. DOI:10.1680/adcr.2000.12.1.29 (Year: 2000).*

U.S. Appl. No. 15/753,603, filed Feb. 20, 2018, US 2019/0263720 A1, Torben Gaedt, et al.

International Preliminary Report on Patentability dated Aug. 27, 2019 in PCT/EP2018/054430 filed Feb. 22, 2018, 8 pages.

International Search Report dated May 28, 2018 in PCT/EP2018/054430, 4 pages (English translation previously filed).

International Search Report dated May 28, 2018 in PCT/EP2018/054430 filed Feb. 22, 2018.

Chuichi Tashiro, et al., "Effect Upon Strength of Cement Paste by Addition of Cement Hydrates," 23rd General Meeting of Cement Association Japan, XP009195221, Jan. 1, 1969, pp. 136-141.

Zeng et al., Synthesis and Characterization of Different Cyrstalline Calcium Silicate Hydrate: Application for the Removal of Aflatoxin B1 from Aqueous Solution, Mar. 17, 2014, Journal of Nanomaterials, Hindawi Publishing Corporation, 1-10, vol. 2014, Article ID 431925.

* cited by examiner

COMPOSITION CONTAINING A SEMI-ORDERED CALCIUM SILICATE HYDRATE

The present invention relates to a composition comprising calcium silicate hydrate, which composition is particularly suitable as curing accelerator for hydraulic binders, a process for producing the composition and the use thereof.

In cement hydration, the various cement clinker phases react with water to form mainly the hydrate phases calcium silicate hydrate, ettringite, calcium-aluminate-ferrite phases, monosulfate (kuzelite) and portlandite.

Accelerating cement hydration by addition of calcium silicate hydrate nuclei to cement is known from WO 2010/026155. The strength development of a cement can thus be accelerated by the addition of such calcium silicate hydrate nuclei. The calcium silicate hydrate nuclei are obtainable by reaction of a water-soluble calcium component with a water-soluble silicon component in aqueous solution or by reaction of a calcium compound with silicon dioxide, in each case in the presence of a water-soluble comb polymer which is suitable as plasticizer for hydraulic binders. The compositions obtained here have an excellent accelerating effect but also a relatively high viscosity which can make use difficult, for example when the composition has to be pumped or sprayed. In addition, the compositions obtained by reaction of a water-soluble calcium component with a water-soluble silicon component comprise foreign ions such as chloride and nitrate which are associated with use disadvantages, such as corrosivity.

A setting and curing accelerator for siliceous, hydraulic binders which is obtained, in particular, from the hydration of portland cements, comminuted portland clinkers or formulated portland cements or mixtures of the abovementioned starting materials by hydration at <90° C. and subsequent milling is known from WO 95/04007.

WO 2013/017391 describes a process for producing a quick-setting hydraulic binder by milling a cement clinker with from 0.1 to 5% by weight of a material comprising more than 15% by weight of calcium silicate hydrate. Water reducers, which are polyoxyalkylene polycarboxylates, can also be comilled here. The commercially available, crystalline Circolit® is used here as calcium silicate hydrate-comprising material.

G. Land and D. Stephan, Cement & Concrete Composites 57 (2015) 64-67, describe the use of tobermorite particles (630 nm) and xonotlite particles (420 nm) for accelerating cement hydration by addition of an aqueous dispersion of the particles to CEM I white cement. Here it has been found that the accelerating effect of the xonotlite particles is greater than that of the tobermorite particles.

EP 2 243 754 A1 describes a process for producing a belite-comprising binder, in which a starting material comprising calcium, silicon and oxygen atoms is admixed with water, hydrothermally treated at a temperature of from 120° C. to 250° C. and the resulting intermediate is subjected to reaction milling at a temperature of from 100° C. to 200° C. for a period of from 5 to 30 minutes. With reaction and dewatering, this forms the belite-comprising binder which can be used like portland cement.

EP 2 801 557 B9 describes a process for producing a highly reactive binder, in which a starting material is mixed from one or more raw materials comprising CaO, MgO, $SiO_2$, $Al_2O_3$ and $Fe_2O_3$ or other compounds of these elements. The mixture, which necessarily comprises Mg and Al, is hydrothermally treated at from 100 to 300° C. and a residence time of from 0.1 to 24 hours and the resulting intermediate is heat treated at from 350 to 600° C. The product obtained comprises at least one calcium silicate and at least one calcium aluminate.

EP 2 801 558 A1 describes a similar process, but the process product is used as accelerator for stiffening/setting and/or curing of portland cement.

EP 2 801 559 A1 describes a method for reinforcing the latently hydraulic and/or pozzolanic reactivity of materials such as waste products and by-products, wherein a starting material comprising a CaO source and a source of $SiO_2$ and/or $Al_2O_3$ is mixed with water and hydrothermally treated at from 100° C. to 300° C. with a residence time of from 0.1 to 50 hours. The product obtained has hydraulic, pozzolanic or latently hydraulic reactivity.

WO 2017/032719 describes a process for producing a composition which is suitable as accelerator for the curing of cement. The process comprises contacting of a hydraulic or latent hydraulic binder with a dispersant which is suitable for dispersing in organic particles in water.

TASHIRO et al., 23rd general Meeting of Cement Association Japan, Jan. 1, 1969, pages 136-141, examine the influence of synthetic calcium silicate hydrate on the strength of cement adhesive. The synthetic calcium silicate hydrate was produced at 130° C. over a period of 5 days at 5-10 atms. It can be seen from the X-ray diffraction pattern that the synthetic calcium silicate hydrate comprises considerable amounts of quartz.

The accelerators based on calcium silicate hydrate which are known from the prior art either have an unsatisfactory accelerating effect or are associated with use disadvantages (excessively high viscosity, corrosivity), so that the economically feasible use possibilities are limited.

It is therefore an object of the present invention to provide a calcium silicate hydrate-comprising composition which, in particular, has a satisfactory accelerating effect on the curing of hydraulic and latent hydraulic binders and has improved use properties. In particular, the composition should be easy-to-handle, in particular have a viscosity which allows easy pumping and spraying of the composition, and be suitable as curing accelerator for hydraulically or latently hydraulically setting binders and thus improve the early strength of the hydraulically or latently hydraulically setting binders, in particular portland cement. Furthermore, the composition should be able to be produced economically advantageously using cheap and readily available raw materials.

The term early strength in connection with hydraulically setting binders is for the present purposes the compressive strength 6 hours after mixing of the hydraulically setting binder with water. In the case of latently hydraulically setting binders, the early strength is the compressive strength 7 days after mixing the hydraulically setting binder with water.

It has surprisingly been found that this object is achieved by a composition which comprises a mineral constituent and a polymeric water-soluble dispersant, wherein the mineral constituent comprises a semi-ordered calcium silicate hydrate having an apparent crystallite size of 15 nm or less and less than 35% by weight of crystalline phases other than the semi-ordered calcium silicate hydrate.

It has been found that the composition of the invention has a more pronounced accelerating effect on the curing of hydraulic or latent hydraulic binders than comparative compositions in which the mineral component comprises a calcium silicate hydrate having a higher degree of crystallinity. Furthermore, the compositions of the invention remain pumpable even at high solids contents, in contrast to those compositions based on calcium silicate hydrate gels or completely amorphous calcium silicate hydrates.

The expression "comprising" or "comprises" used here also encompasses the expressions "consisting essentially of" and "consisting of" without being synonymous with these expressions.

Mineral Constituent

The mineral constituent of the composition of the invention preferably comprises at least 95% by weight, more preferably at least 98% by weight, based on the dry weight of the mineral constituent, of calcium oxide (CaO) and silicon oxide ($SiO_2$). The molar ratio of Ca/Si in the mineral constituent is preferably in the range from 0.5 to 2.5, more preferably from 0.8 to 2.2, particularly preferably from 1.0 to 2.0 or from 1.6 to 2.0.

Owing to production-related impurities, the mineral constituent can comprise small amounts of aluminum ions, with the molar ratio of silicon/aluminum in the mineral constituent being from 10 000:1 to 2:1, preferably from 1000:1 to 5:1 and particularly preferably from 100:1 to 10:1.

The mineral constituent is essentially free of cement, cement clinker and/or ettringite. Here, "essentially free" means less than 10% by weight or less than 5% by weight, preferably less than 1% by weight and in particular 0% by weight, in each case based on the total weight of the mineral constituent.

The mineral constituent of the composition of the invention comprises a semi-ordered calcium silicate hydrate. For the purposes of the present invention, "semi-ordered" means that the calcium silicate hydrate has (1) a lower degree of order than a macroscopic crystalline calcium silicate hydrate and (2) a higher degree of order than amorphous calcium silicate hydrate. Semi-ordered calcium silicate hydrate has physical properties which differ both from the pure crystalline form and from the pure amorphous form.

One suitable method for determining whether a calcium silicate hydrate is present in semi-ordered form employs X-ray diffraction. Diffraction patterns of the calcium silicate hydrate can be recorded using a commercial powder diffractometer. The X-ray diffraction pattern of the semi-ordered calcium silicate hydrate differs from the X-ray diffraction pattern of a crystalline calcium silicate hydrate. Semi-ordered calcium silicate hydrate displays a diffraction pattern in which the reflections or diffraction lines or "peaks" are broader or less well-defined and/or partly absent compared to the diffraction pattern of the crystalline form. In the following, a "peak" is a maximum in the plot of the X-ray diffraction intensity against the diffraction angle. The main diffraction peak of the semi-ordered calcium silicate hydrate has, for example, a width at half height which is at least 1.25 times, usually at least 2 times or at least 3 times, the width at half height of the corresponding main diffraction peak of the crystalline form having a crystallite size of 50 nm or more.

Furthermore, the X-ray diffraction pattern of the semi-ordered calcium silicate hydrate also differs from the purely X-ray-amorphous form. The X-ray diffraction pattern of the semi-ordered calcium silicate hydrate displays few broad phase-specific X-ray diffraction maxima which indicate a certain degree of order of the calcium silicate hydrate, while the X-ray-amorphous form displays no distinguishable X-ray diffraction maxima. No calcium silicate hydrate phase can be assigned unambiguously to the X-ray-amorphous form.

The semi-ordered calcium silicate hydrate has a long-range order of less than 100 repeating units, usually less than 20 repeating units, of the unit cell in at least one direction in space. If the coherently scattering regions (crystallites), which correspond to the repeating units of the unit cell, are very small in a sample, the individual crystallites which are actually present in the reflection plane are often slightly tilted relative to one another. In addition, the disruption of the structure at the grain boundaries results in changes in the diffraction behavior. The angle range in which reflection and thus a diffraction signal still occurs is broadened thereby. An "apparent" crystallite size can be calculated by the method of Scherrer from the widths at half height of X-ray diffraction signals:

$$\beta = \lambda/\varepsilon \cos\theta$$

$\beta$=width at half height
$\lambda$=wavelength
$\varepsilon$=apparent crystallite size
$\theta$=Bragg angle In practice, the "whole pattern fitting structure refinement (PFSR)" of Hugo Rietveld ("Rietveld analysis") has been found to be useful for evaluating the diffraction pattern. This software method serves to refine a number of measurement parameters, including lattice parameters, signal width and signal shape. Theoretical diffraction patterns can be calculated in this way. As soon as the calculated diffraction pattern is virtually identical to the data of an unknown sample, precise quantitative information as to crystallite size and amorphous content can be determined.

According to the invention, the semi-ordered calcium silicate hydrate has an apparent crystallite size of 15 nm or less, in particular 10 nm or less, preferably 5 nm or less, determined by means of X-ray diffraction analysis and subsequent Rietveld analysis. The apparent crystallite size is generally at least 1 nm, e.g. from 1 to 15 nm, or from 1 to 10 nm and particularly preferably from 1 nm to 5 nm.

The unit cells of the ordered regions of the semi-ordered calcium silicate hydrate, the size of which is described with the aid of their apparent crystallite size in the present patent application, are derived from crystalline calcium silicate hydrate phases (C-S-H). Crystalline calcium silicate hydrate phases are, in particular, foshagite, hillebrandite, xonotlite (belovite), xonotlite (kudohite), nekoite, clinotobermorite, 9 Å—tobermorite (riversiderite), 10 Å—tobermorite, 11 Å—tobermorite (C/S 0.75 and 0.66), 14 Å—tobermorite (plombierite), jennite, metajennite, calcium chondrodite, afwillite, $\alpha$-$C_2SH$, dellaite, jaffeite, rosenhahnite, killalaite, bultfonteinite, reinhardbraunsite, kilchoanite, $C_8S_5$, okenite, reyerite, gyrolith, truscottite, K-phase, Z-phase, scawtite, fukalite, tylleite, spurrite and/or suolunite, preferably as xonotlite, 9 Å—tobermorite (riversiderite), 11 Å—tobermorite, 14 Å—tobermorite (plombierite), jennite, metajennite, afwillite and/or jaffeite.

The unit cells of the ordered regions are preferably derived from 9 Å—tobermorite (riversiderite), 10 Å—tobermorite, 11 Å—tobermorite (C/S 0.75 and 0.66), 14 Å—tobermorite (plombierite), scawtite and/or xonotlite or mixtures.

For the present purposes, it has been found to be a sufficient approximation for the determination of the apparent crystallite size to be based exclusively on the unit cell of 14 Å—tobermorite (plombierite).

The mineral constituent comprises less than 35% by weight, based on the dry weight of the mineral constituent, of crystalline phases other than the semi-ordered calcium silicate hydrate, i.e. crystalline phases which are not calcium silicate hydrate phase (C-S-H) (hereinafter also: "crystalline foreign phases"). Crystalline foreign phases are portlandite ($Ca(OH)_2$), calcite ($CaCO_3$), aragonite ($CaCO_3$), vaterite (CaCO$_3$) and α-quartz (SiO$_2$). The content of crystalline foreign phases can be in the range from 0.1 to less than 35% by weight, preferably from 1 to 25% by weight, based on the dry weight of the mineral constituent. The dry weight is determined by drying the mineral constituent to constant weight at 105° C.

In the case of contamination with aluminum, the mineral constituent can also comprise aluminum-comprising phases such as gibbsite (Al(OH)$_3$).

The mineral constituent typically also comprises an X-ray-amorphous phase in addition to the semi-ordered calcium silicate hydrate (and possibly crystalline foreign phases). In one embodiment, the mineral constituent comprises at least ≥10% by weight, preferably ≥40% by weight, particularly preferably ≥60% by weight and in particular from 10 to 99.9% by weight or from 10 to 80% by weight, preferably from 40 to 80% by weight, of X-ray-amorphous phase, based on the dry weight of the mineral constituent, determined by means of X-ray diffraction analysis and subsequent Rietveld analysis.

The sum of semi-ordered calcium silicate hydrate and X-ray-amorphous phase is preferably at least 65% by weight, e.g. from 65 to 99% by weight, based on the dry weight of the mineral constituent, determined by means of X-ray diffraction analysis and subsequent Rietveld analysis.

Preference is given to no foreign ions such as alkali metal ions, chloride ions or nitrate ions or only a very small amount of foreign ions being introduced into the composition according to the invention via the mineral constituent. In one embodiment, the composition of the invention comprises 2% by weight or less of alkali metals, based on the dry weight of the mineral constituent.

The mineral constituent can be obtained by a hydrothermal process with adherence to particular conditions, i.e. by reaction of a calcium hydroxide source, e.g. calcium oxide or calcium hydroxide, with a silicon dioxide source, e.g. silicon dioxide, in the presence of water and at an elevated temperature of at least 100° C. and elevated pressure, advantageously in an autoclave. Here, the mineral constituent is obtained as solid with physically adsorbed water. Apart from optional drying at a temperature of about 105° C., it is not subjected to any further thermal treatment. The mineral constituent produced in this way comprises semi-ordered calcium silicate hydrate, crystalline foreign phases including the unreacted crystalline foreign phases or the crystalline foreign phases formed in the reaction, e.g. quartz, portlandite, calcite, etc., and also X-ray-amorphous phases.

The production of the mineral constituent is advantageously carried out in a closed vessel, for example an autoclave, preferably at a temperature in the range from 100° C. to 400° C., in particular from 110 to 300° C. or from 110 to 230° C. or from 130 to 200° C. or from 130 to 180° C. or from 155 to 180 or from 160 to 180° C., and a pressure resulting therefrom. As calcium oxide or calcium hydroxide, it is possible to use, for example, quicklime, slacked lime, etc. Examples of suitable types of silicon dioxide are silica sand or quartz flour, microsilica, etc. Furthermore, pozzolanic binders such as flyashes, slags such as blast furnace slag, and/or metakaolins can also be used as starting materials. In order to assist the reaction and shorten the reaction time, the starting materials are generally used with an average particle size of <1 mm. The silicon dioxide source generally has a particle size d(99) in the range from 1 to 100 μm, in particular from 1 to 90 μm. The amount of calcium oxide or calcium hydroxide and silicon dioxide is generally selected so that the molar ratio of Ca/Si in the mineral constituent is in the range from 0.5 to 2.5, preferably from 0.8 to 2.2, particularly preferably from 1.0 to 2.0.

It has been found to be advantageous to use a foaming agent, in particular aluminum powder or a paste comprising metallic aluminum, in the hydrothermal production of the mineral constituent.

It has been found to be advantageous to comminute the mineral constituent after the hydrothermal synthesis. Conventional apparatuses such as crushers and ball mills are suitable for this purpose. Comminution is carried out until a particle size (d(97)) of ≤5 mm, preferably ≤2 mm and in particular a particle size (d(97)) in the range from 0.05 mm to 5 mm, preferably from 0.1 mm to 2 mm, in particular from 0.3 mm to 1 mm, is attained. Comminution is carried out at a temperature of ≤80 C, in particular ≤60 C, preferably ≤50 C.

The mineral constituent obtained after the hydrothermal synthesis is preferably firstly subjected to mechanical comminution at a temperature of ≤80 C, in particular ≤60 C, preferably ≤50 C.

After mechanical comminution, the mineral constituent has a particle size (d(97)) of ≤5 mm, preferably ≤2.5 mm and in particular ≤1 mm. For example, the particle size (d(97)) of the mineral constituent after mechanical comminution is in the range from 0.05 mm to 5 mm, preferably from 0.1 mm to 2 mm, in particular from 0.3 mm to 1 mm.

The mineral constituent which is brought into contact with the polymeric dispersant preferably has a specific BET surface area in the range from 30 to 150 m$^2$/g, preferably from 80 to 150, in particular from 90 to 150 m$^2$/g, particularly preferably from 100 to 150 m$^2$/g, determined in accordance with DIN ISO 9277:2003-05.

Water-Soluble Polymeric Dispersant

For the present purposes, a "water-soluble polymeric dispersant" is an organic water-soluble polymeric dispersant, i.e. it is an organic polymer which at 20 C and atmospheric pressure has a solubility in water of at least 1 gram per liter, in particular at least 10 gram per liter and particularly preferably at least 100 gram per liter.

The dispersant is, in particular, a comb polymer having polyether side chains, preferably polyalkylene oxide side chains.

The polymeric dispersant is preferably a copolymer which has acid functions and polyether side chains on the main chain.

In one embodiment, the polymeric dispersant has at least one structural unit of the general formulae (Ia), (Ib), (Ic) and/or (Id), where the structural units (Ia), (Ib), (Ic) and (Id) are able to be identical or different within a single polymer molecule and also between various polymer molecules:

where
R$^1$ is H or an unbranched or branched C$_1$-C$_4$-alkyl group, CH$_2$COOH or CH$_2$CO—X—R$^2$, preferably H or CH$_3$;

X is NH—$(C_nH_{2n})$, $O(C_nH_{2n})$ where n=1, 2, 3 or 4, where the nitrogen atom or the oxygen atom is bound to the CO group, or is a chemical bond, preferably X=chemical bond or $O(C_nH_{2n})$;

$R^2$ is OM, $PO_3M_2$, O—$PO_3M_2$ or $SO_3M$; with the proviso that X is a chemical bond when $R^2$ is OM;

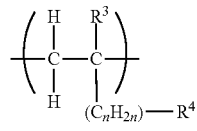
(Ib)

where
$R^3$ is H or an unbranched or branched $C_1$-$C_4$-alkyl group, preferably H or $CH_3$;
n is 0, 1, 2, 3 or 4, preferably 0 or 1;
$R^4$ is $PO_3M_2$, O—$PO_3M_2$ or $SO_3M$;

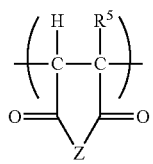
(Ic)

where
$R^5$ is H or an unbranched or branched $C_1$-$C_4$-alkyl group, preferably H;
Z is O or $NR^7$, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$, $(C_nH_{2n})$—$SO_3M$ or $(C_6H_4)$—$SO_3M$, and
n is 1, 2, 3 or 4, preferably 1, 2 or 3;

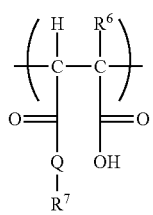
(Id)

where
$R^6$ is H or an unbranched or branched $C_1$-$C_4$-alkyl group, preferably H;
Q is $NR^7$ or O, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$, $(C_nH_{2n})$—$SO_3M$ or $(C_6H_4)$—$SO_3M$,
n is 1, 2, 3 or 4, preferably 1, 2 or 3; and
each M in the above formulae is independently H or one cation equivalent.

The comb polymer preferably has at least one structural unit of the formula (Ia) in which $R^1$ is H or $CH_3$; and/or at least one structural unit of the formula (Ib) in which $R_3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

The comb polymer preferably has at least one structural unit of the formula (Ia) in which $R^1$ is H or $CH_3$ and $XR^2$ is OM or X is $O(C_nH_{2n})$ where n=1, 2, 3 or 4, in particular 2, and $R^2$ is O—$PO_3M_2$.

The comb polymer preferably has, as polyether side chain, at least one structural unit of the general formulae (IIa), (IIb), (IIc) and/or (IId):

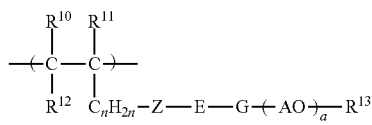
(IIa)

where
$R^{10}$, $R^{11}$ and $R^{12}$ are each, independently of one another, H or an unbranched or branched $C_1$-$C_4$-alkyl group;
Z is O or S;
E is an unbranched or branched $C_1$-$C_6$-alkylene group, a cyclohexylene group, $CH_2$—$C_6H_{10}$, 1,2-phenylene, 1,3-phenylene or 1,4-phenylene;
G is O, NH or CO—NH; or
E and G are together a chemical bond;
A is $C_xH_{2x}$ where x=2, 3, 4 or 5 or $CH_2CH(C_6H_5)$, preferably 2 or 3;
n is 0, 1, 2, 3, 4 or 5, preferably 0, 1 or 2;
a is an integer from 2 to 350, preferably from 5 to 150;
$R^{13}$ is H, an unbranched or branched $C_1$-$C_4$-alkyl group, CO—$NH_2$ and/or $COCH_3$;

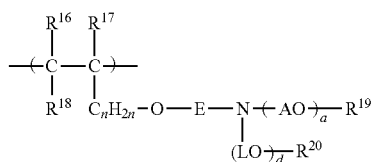
(IIb)

where
$R^{16}$, $R^{17}$ and $R^{18}$ are each, independently of one another, H or an unbranched or branched $C_1$-$C_4$-alkyl group;
E is an unbranched or branched $C_1$-$C_6$-alkylene group, a cyclohexylene group, $CH_2$—$C_6H_{10}$, 1,2-phenylene, 1,3-phenylene or 1,4-phenylene or a chemical bond;
A is $C_xH_{2x}$ where x=2, 3, 4 or 5 or $CH_2CH(C_6H_5)$, preferably 2 or 3;
n is 0, 1, 2, 3, 4 and/or 5, preferably 0, 1 or 2;
L is $C_xH_{2x}$ where x=2, 3, 4 or 5 or $CH_2$—$CH(C_6H_5)$, preferably 2 or 3;
a is an integer from 2 to 350, preferably from 5 to 150;
d is an integer from 1 to 350, preferably from 5 to 150;
$R^{19}$ is H or an unbranched or branched $C_1$-$C_4$-alkyl group;
$R^{20}$ is H or an unbranched $C_1$-$C_4$-alkyl group;

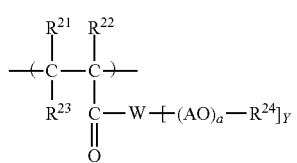
(IIc)

where
$R^{21}$, $R^{22}$ and $R^{23}$ are each, independently of one another, H or an unbranched or branched $C_1$-$C_4$-alkyl group;
W is O, $NR^{25}$ or N;
Y is 1 when W=O or $NR^{25}$ and is 2 when W=N;
A is $C_xH_{2x}$ where x=2, 3, 4 or 5 or $CH_2CH(C_6H_5)$, preferably 2 or 3;
a is an integer from 2 to 350, preferably from 5 to 150;
$R^{24}$ is H or an unbranched or branched $C_1$-$C_4$-alkyl group; and
$R^{25}$ is H or an unbranched or branched $C_1$-$C_4$-alkyl group;

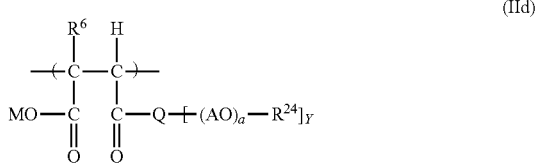

(IId)

where
$R^6$ is H or an unbranched or branched $C_1$-$C_4$-alkyl group;
Q is $NR^{10}$, N or O;
V is 1 when W=O or $NR^{10}$ and is 2 when W=N;
$R^{10}$ is H or an unbranched or branched $C_1$-$C_4$-alkyl group; and
A is $C_xH_{2x}$ where x=2, 3, 4 or 5, or $CH_2C(C_6H_5)H$, preferably 2 or 3;
$R^{24}$ is H or an unbranched or branched $C_1$-$C_4$-alkyl group;
M is H or one cation equivalent; and
a is an integer from 2 to 350, preferably from 5 to 150.

Particular preference is given to the structural unit of the formula Ia being a methacrylic acid unit or acrylic acid unit, the structural unit of the formula Ic being a maleic anhydride unit and the structural unit of the formula Id being a maleic acid unit or a maleic monoester unit.

If the monomers (I) are phosphoric esters or phosphonic esters, they can also comprise the corresponding diesters and triesters and also the monoesters of diphosphoric acid. These are generally formed in addition to the monoester in various proportions, for example 5-30 mol % of diester and 1-15 mol % of triester together with 2-20 mol % of the monoester of diphosphoric acid in the esterification of organic alcohols with phosphoric acid, polyphosphoric acid, phosphorus oxides, phosphorus halides or phosphorus oxyhalides or the corresponding phosphonic acid compounds.

The comb polymer preferably has, as polyether side chain:

(a) at least one structural unit of the formula (IIa) in which $R^{10}$ and $R^{12}$ are each H, $R^{11}$ is H or $CH_3$, E and G together are a chemical bond, A is $C_xH_{2x}$ where x=2 and/or 3, a is from 3 to 150 and $R^{13}$ is H or an unbranched or branched $C_1$-$C_4$-alkyl group; and/or (b) at least one structural unit of the formula (IIb) in which $R^{16}$ and $R^{18}$ are each H, $R^{17}$ is H or $CH_3$, E is an unbranched or branched $C_1$-$C_6$-alkylene group, A is $C_xH_{2x}$ where x=2 and/or 3, L is $C_xH_{2x}$ where x=2 and/or 3, a is an integer from 2 to 150, d is an integer from 1 to 150, $R^{19}$ is H or an unbranched or branched $C_1$-$C_4$-alkyl group and $R^{20}$ is H or an unbranched or branched $C_1$-$C_4$-alkyl group; and/or (c) at least one structural unit of the formula (IIc) in which $R^{21}$ and $R^{23}$ are each H, $R^{22}$ is H or $CH_3$, A is $C_xH_{2x}$ where x=2 and/or 3, a is an integer from 2 to 150 and $R^{24}$ is H or an unbranched or branched $C_1$-$C_4$-alkyl group; and/or (d) at least one structural unit of the formula (IId) in which $R^6$ is H, Q is O, $R^7$ is $(C_nH_{2n})$—O-$(AO)_a$-$R^9$, n is 2 and/or 3, A is $C_xH_{2x}$ where x=2 and/or 3, a is an integer from 1 to 150 and $R^9$ is H or an unbranched or branched $C_1$-$C_4$-alkyl group.

The structural unit of the formula IIa is particularly preferably an alkoxylated isoprenyl, alkoxylated hydroxybutyl vinyl ether, alkoxylated (meth)allyl alcohol or a vinylated methylpolyalkylene glycol unit, in each case preferably having an arithmetic mean of from 2 to 350 oxyalkylene groups.

The comb polymer preferably comprises at least one structural unit of the formula (IIa) and/or (IIc), in particular of the formula (IIa).

Apart from the structural units of the formulae (I) and (II), the polymeric dispersant can also comprise further structural units which are derived from free-radically polymerizable monomers, e.g. hydroxyethyl (meth)acrylate, hydroxypropyl (meth)acrylate, (meth)acrylamide, ($C_1$-$C_4$)-alkyl (meth)acrylates, styrene, styrenesulfonic acid, 2-acrylamido-2-methylpropanesulfonic acid, (meth)allylsulfonic acid, vinylsulfonic acid, vinyl acetate, acrolein, N-vinylformamide, vinylpyrrolidone, (meth)allyl alcohol, isoprenol, 1-butylvinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The preparation of the comb polymers which comprise the structural units (I) and (II) is carried out in a conventional way, for example by free-radical polymerization. It is, for example, described in EP0894811, EP1851256, EP2463314, EP0753488.

The comb polymer preferably has units of the formulae (I) and (II), in particular of the formulae (Ia) and (IIa).

The comb polymer preferably has structural units of the formulae (Ia) and (IIc).

The comb polymer preferably has structural units of the formulae (Ic) and (IIa).

The comb polymer preferably has structural units of the formulae (Ia), (Ic) and (IIa).

The comb polymer is preferably made up of (i) anionic or anionogenic structural units which are derived from acrylic acid, methacrylic acid, maleic acid, hydroxyethylacrylate phosphate, and/or hydroxyethyl methacrylate phosphate, hydroxyethyl acrylate diester of phosphoric acid and/or hydroxyethyl methacrylate diester of phosphoric acid and (ii) structural units having polyether side chains, where the structural units are derived from $C_1$-$C_4$-alkylpolyethylene glycol acrylate, polyethylene glycol acrylate, $C_1$-$C_4$-alkyl polyethylene glycol methacrylate, polyethylene glycol methacrylate, $C_1$-$C_4$-alkyl polyethylene glycol acrylate, polyethylene glycol acrylate, vinyloxy-$C_2$-$C_4$-alkylenepolyethylene glycol, vinyloxy-$C_2$-$C_4$-alkylenepolyethylene glycol $C_1$-$C_4$-alkyl ether, allyloxypolyethylene glycol, allyloxypolyethylene glycol $C_1$-$C_4$-alkyl ether, methallyloxypolyethylene glycol, methallyloxypolyethylene glycol $C_1$-$C_4$-alkyl ether, isoprenyloxypolyethylene glycol and/or isoprenyloxypolyethylene glycol $C_1$-$C_4$-alkyl ether.

The comb polymer is preferably made up of structural units (i) and (ii) which are derived from (i) hydroxyethyl acrylate phosphate and/or hydroxyethyl methacrylate phosphate and (ii) $C_1$-$C_4$-alkyl polyethylene glycol acrylate and/or $C_1$-$C_4$-alkyl polyethylene glycol methacrylate; or (i) acrylic acid and/or methacrylic acid and (ii) $C_1$-$C_4$-alkylpolyethylene glycol acrylate and/or $C_1$-$C_4$-alkylpolyethylene glycol methacrylate; or (i) acrylic acid, methacrylic acid and/or maleic acid and (ii) vinyloxy-$C_2$-$C_4$-alkylenepolyethylene glycol, allyloxypolyethylene glycol, methallyloxypolyethylene glycol and/or isoprenyloxypolyethylene glycol.

The comb polymer is preferably made up of structural units (i) and (ii) which are derived from (i) hydroxyethyl methacrylate phosphate and (ii) $C_1$-$C_4$-alkyl polyethylene glycol methacrylate or polyethylene glycol methacrylate; or (i) methacrylic acid and (ii) $C_1$-$C_4$-alkylpolyethylene glycol methacrylate or polyethylene glycol methacrylate; or (i) acrylic acid and maleic acid and (ii) vinyloxy-$C_2$-$C_4$-alkylenepolyethylene glycol or (i) acrylic acid and maleic acid and (ii) isoprenyloxypolyethylene glycol or (i) acrylic acid and (ii) vinyloxy-$C_2$-$C_4$-alkylenepolyethylene glycol or (i) acrylic acid and (ii) isoprenyloxypolyethylene glycol or (i) acrylic acid and (ii) methallyloxypolyethylene glycol or (i) maleic acid and (ii) isoprenyloxypolyethylene glycol or (i) maleic acid and (ii) allyloxypolyethylene glycol or (i) maleic acid and (ii) methallyloxypolyethylene glycol.

The molar ratio of the structural units (I):(II) is preferably from 1:4 to 15:1, in particular from 1:1 to 10:1.

The molecular weight of the polyether side chains is preferably >500 g/mol, more preferably >3000 g/mol, and <8000 g/mol, preferably <6000 g/mol.

The molecular weight of the polyether side chains is preferably in the range of 2000-8000 g/mol, in particular 4000-6000 g/mol.

In one embodiment, the comb polymer is a polycondensation product comprising structural units (III) and (IV):

(III)

where

T is a substituted or unsubstituted phenyl radical, substituted or unsubstituted naphthyl radical or a substituted or unsubstituted heteroaromatic radical having from 5 to 10 ring atoms of which 1 or 2 atoms are heteroatoms selected from among N, O and S;

n is 1 or 2;

B is N, NH or O, with the proviso that n is 2 when B is N and with the proviso that n is 1 when B is NH or O;

A is $C_xH_{2x}$ where x=2, 3, 4 or 5 or $CH_2CH(C_6H_5)$;

a is an integer from 1 to 300, preferably from 1 to 150;

$R^{25}$ is H, a branched or unbranched $C_1$-$C_{10}$-alkyl radical, $C_5$-$C_8$-cycloalkyl radical, aryl radical or heteroaryl radical having from 5 to10 ring atoms of which 1 or 2 atoms are heteroatoms selected from among N, O and S;

where the structural unit (IV) is selected from among the structural units (IVa) and (IVb)

(IVa)

where

D is a substituted or unsubstituted phenyl radical, substituted or unsubstituted naphthyl radical or a substituted or unsubstituted heteroaromatic radical having from 5 to 10 ring atoms of which 1 or 2 atoms are heteroatoms selected from among N, O and S;

E is N, NH or O, with the proviso that m is 2 when E is N and with the proviso that m is 1 when E is NH or O;

A is $C_xH_{2x}$ where x=2, 3, 4 or 5 or $CH_2CH(C_6H_5)$;

b is an integer from 1 to 300, preferably from 1 to 50;

M is in each case independently H, one cation equivalent; and

(IVb)

where

V is a substituted or unsubstituted phenyl radical or substituted or unsubstituted naphthyl radical, where V is optionally substituted by 1 or two radicals selected independently from among $R^8$, OH, $OR^8$, $(CO)R^8$, COOM, $COOR^8$, $SO_3R^8$ and $NO_2$, preferably OH; $OC_1$-$C_4$-alkyl and $C_1$-$C_4$-alkyl;

$R^7$ is COOM, $OCH_2COOM$, $SO_3M$ or $OPO_3M_2$;

M is H or one cation equivalent;

where the phenyl, naphthyl or heteroaromatic radicals mentioned are optionally substituted by 1 or two radicals selected from among $R^8$, OH, $OR^8$, $(CO)R^8$, COOM, $COOR^8$, $SO_3R^8$ and $NO_2$; and $R^8$ is $C_1$-$C_4$-alkyl, phenyl, naphthyl, phenyl-$C_1$-$C_4$-alkyl or $C_1$-$C_4$-alkylphenyl.

In the general formula (III), a is preferably an integer from 1 to 300 and in particular from 5 to 150, and in the general formula (IV), b is preferably an integer from 1 to 300, in particular from 1 to 50 and particularly preferably from 1 to 10. Furthermore, the radicals of the general formulae (III) or (IV) can, independently of one another, in each case have the same chain length, with a and b each being represented by one number. It is generally advantageous here for mixtures having different chain lengths to be present in each case, so that the radicals of the structural units in the polycondensation product have different numerical values for a and independently for b.

In the formula III, preference is given to T being a substituted or unsubstituted phenyl radical or naphthyl radical, A being $C_xH_{2x}$ where x=2 and/or 3, a being an integer from 1 to 150 and $R^{25}$ being H or a branched or unbranched $C_1$-$C_{10}$-alkyl radical.

In the formula Iva, preference is given to D being a substituted or unsubstituted phenyl radical or naphthyl radical, E being NH or O, A being $C_xH_{2x}$ where x=2 and/or 3 and b being an integer from 1 to 150.

T and/or D are preferably phenyl or naphthyl substituted by 1 or 2 $C_1$-$C_4$-alkyl groups, hydroxy groups or 2 $C_1$-$C_4$-alkoxy groups.

Preference is given to V being phenyl or naphthyl substituted by 1 or 2 $C_1$-$C_4$-alkyl, OH, $OCH_3$ or COOM groups and $R^7$ being COOM or $OCH_2COOM$.

The structural units T and D in the general formulae (III) and (IV) of the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D can be selected independently of one another and can each also be derived from a mixture of the radicals mentioned. The groups B and E are, independently of one another, preferably O. All structural units A can be identical or different both within individual polyether side chains and also between various polyether side chains. A is $C_2H_4$ in a particularly preferred embodiment.

It is advantageous to have a relatively high proportion of structural units (IV) in the polycondensation product, since a relatively high negative charge of the polymers has an advantageous effect on the stability of the aqueous colloidal preparation. The molar ratio of the structural units (IVa):(IVb), when both are present, is typically from 1:10 to 10:1 and preferably from 1:3 to 3:1.

In particular embodiments the polycondensation product comprises a further structural unit (V) of the formula

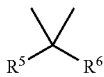
(V)

where
$R^5$ and $R^6$ can be identical or different and be H, $CH_3$, COOH or a substituted or unsubstituted phenyl or naphthyl group or be a substituted or unsubstituted heteroaromatic group having from 5 to 10 ring atoms of which 1 or 2 atoms are heteroatoms selected from among N, O and S.

$R^5$ and $R^6$ can be identical or different and each be H, $CH_3$ or COOH, in particular H or one of the radicals $R^5$ and $R^6$ can be H and the other can be $CH_3$. Typically, $R^5$ and $R^6$ in the structural unit (V) are identical or different and are each H, COOH and/or methyl. Very particular preference is given to H.

The polycondensates are typically prepared by a process in which the compounds on which the structural units (III), (IV) and (V) are based are reacted with one another. The preparation of the polycondensates is, for example, described in WO 2006/042709 and WO 2010/026155.

The monomer having a keto group is preferably an aldehyde or ketone. Examples of monomers of the formula (V) are formaldehyde, acetaldehyde, acetone, glyoxylic acid and/or benzaldehyde. Formaldehyde is preferred.

In general, the polycondensation product has a weight average molecular weight of from 5000 g/mol to 200 000 g/mol, preferably from 10 000 to 100 000 g/mol and particularly preferably from 15 000 to 55 000 g/mol.

The molar ratio of the structural units (III):(IV) is preferably from 4:1 to 1:15, in particular from 2:1 to 1:10.

The molar ratio of the structural units (III+IV):(V) is preferably from 2:1 to 1:3, in particular from 1:0.8 to 1:2.

In preferred embodiments, the comb polymer is made up of structural units of the formulae (III) and (IV) in which T and D are each phenyl or naphthyl, where the phenyl or naphthyl is optionally substituted by 1 or 2 $C_1$-$C_4$-alkyl groups, hydroxy groups or 2 $C_1$-$C_4$-alkoxy groups, B and E are O, A is $C_xH_{2x}$ where x=2, a is from 3 to 150, in particular from 10 to 150, and b is 1, 2 or 3.

In particular embodiments, a homopolymer comprising units comprising sulfo and/or sulfonate groups or units comprising carboxyl and/or carboxylate groups or a copolymer comprising units comprising sulfo and/or sulfonate groups and units comprising carboxylate and/or carboxyl groups is used as polymeric dispersant.

For example, the units comprising sulfo and/or sulfonate groups are vinylsulfonic acid, allylsulfonic acid, methallylsulfonic acid, 4-vinylphenylsulfonic acid units or structural units of the formula (VI)

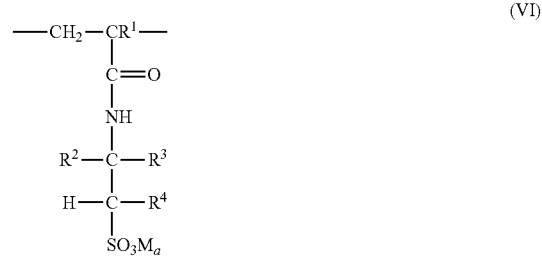

where
$R^1$ is H or $CH_3$,
$R^2$, $R^3$ and $R^4$ are each, independently of one another, H or straight-chain or branched $C_1$-$C_6$-alkyl or $C_6$-$C_{14}$-aryl,
M is H or a cation, in particular a metal cation, preferably a monovalent or divalent metal cation, or an ammonium cation,
a is 1 or 1/valence of the cation, in particular ½ or 1.

The units comprising sulfo and/or sulfonate groups are preferably vinylsulfonic acid, methallylsulfonic acid and/or 2-acrylamido-2-methylpropylsulfonic acid units, in particular 2-acrylamido-2-methylpropylsulfonic acid units.

The units comprising carboxyl and/or carboxylate groups are preferably acrylic acid, methacrylic acid, 2-ethylacrylic acid, vinylacetic acid, crotonic acid, maleic acid, fumaric acid, itaconic acid and/or citraconic acid units and in particular acrylic acid and/or methacrylic acid units.

The molecular weight Mw of the copolymer is preferably in the range from 1000 to 50 000, determined by means of aqueous gel permeation chromatography.

In particularly useful embodiments, the dispersant is selected from among:
copolymers comprising structural units of the formulae (Ia) and (IIa), in particular copolymers comprising structural units derived from acrylic acid and/or methacrylic acid and ethoxylated hydroxyalkyl vinyl ethers, e.g. ethoxylated hydroxybutyl vinyl ether;
copolymers comprising structural units of the formulae (Ia), (Id) and (IIa), in particular copolymers comprising structural units derived from acrylic acid and/or methacrylic acid, maleic acid and ethoxylated hydroxyalkyl vinyl ethers, e.g. ethoxylated hydroxybutyl vinyl ether;
copolymers comprising structural units of the formulae (Ia) and (IIc), in particular copolymers comprising structural units derived from acrylic acid and/or methacrylic acid and esters of acrylic acid or methacrylic acid with polyethylene glycol or polyethylene glycol which is end-capped by $C_1$-$C_{12}$-alkyl;
polycondensation products comprising structural units (III), (IVa) and (V), in particular condensation products of ethoxylated phenol, phenoxy-$C_2$-$C_6$-alkanol phosphate and formaldehyde;
homopolymers comprising units comprising sulfo and/or sulfonate groups or units comprising carboxyl and/or carboxylate groups;
copolymers comprising units comprising sulfo and/or sulfonate groups and units comprising carboxyl and/or carboxylate groups; and/or
polyacrylic acid;
and the salts thereof and combinations of two or more of these dispersants.

In one embodiment, at least one further dispersant selected from among lignosulfonates, melamine-formaldehyde sulfonate condensates, β-naphthalenesulfonic acid condensates, phenolsulfonic acid condensates and sulfonated ketone-formaldehyde condensates is additionally used.

The molar ratio of the structural units (III):(IV) is typically from 4:1 to 1:15 and preferably from 2:1 to 1:10.

In a preferred embodiment, the polycondensation product comprises a further structural unit (V) which is represented by the following formula:

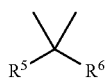

(V)

where $R^5$ is H, $CH_3$, COOH or substituted or unsubstituted phenyl or substituted or unsubstituted naphthyl;

$R^6$ is H, $CH_3$, COOH or substituted or unsubstituted phenyl or substituted or unsubstituted naphthyl.

The comb polymer can also be present in the form of its salts, for example the sodium, potassium, organic ammonium, ammonium and/or calcium salt, preferably as sodium and/or calcium salt.

The molecular weight of the polymeric dispersant, determined by means of gel chromatography using polystyrene as standard, is generally in the range from 5000 to 100 000. The molecular weight of the side chains is generally in the range from 1000 to 10 000.

The charge density of the polymers is generally in the range from 500 µeq/g to 1500 µeq/g.

Preferred polymeric dispersants are:

copolymers comprising structural units of the formulae (Ia) and (IIa), in particular copolymers comprising structural units derived from acrylic acid and/or methacrylic acid and ethoxylated hydroxyalkyl vinyl ethers, e.g. ethoxylated hydroxybutyl vinyl ether;

copolymers comprising structural units of the formulae (Ia), (Id) and (IIa), in particular copolymers comprising structural units derived from acrylic acid and/or methacrylic acid, maleic acid and ethoxylated hydroxyalkyl vinyl ethers, e.g. ethoxylated hydroxybutyl vinyl ether;

copolymers comprising structural units of the formulae (Ia) and (IIc), in particular copolymers comprising structural units derived from acrylic acid and/or methacrylic acid and esters of acrylic acid or methacrylic acid with polyethylene glycol or polyethylene glycol which is end-capped by $C_1$-$C_{12}$-alkyl;

polycondensation products comprising structural units (III), (IVa) and (V), in particular condensation products of ethoxylated phenol, phenoxy-$C_2$-$C_6$-alkanol phosphate and formaldehyde;

homopolymers comprising units comprising sulfo and/or sulfonate groups or units comprising carboxyl and/or carboxylate groups;

copolymers comprising units comprising sulfo and/or sulfonate groups and units comprising carboxyl and/or carboxylate groups; and/or polyacrylic acid;

and the salts thereof and combinations of two or more of these dispersants.

Contacting of the Mineral Constituent with the Water-Soluble Polymeric Dispersant To produce the composition comprising calcium silicate hydrate, the mineral constituent is brought into contact with at least one water-soluble polymeric dispersant in an aqueous medium.

For the contacting with the polymeric dispersant, the mineral constituent can be used in the form of a suspension or as dry powder. The polymeric dispersant is then added all at once or in two or more portions to the suspension comprising the mineral constituent, either as solid or in the form of an aqueous solution. However, the mineral constituent is preferably added all at once or in two or more portions as solid or as aqueous suspension to an aqueous solution of the polymeric dispersant.

In one embodiment, the weight ratio of the mineral constituent (calculated as dry component) to polymeric dispersant is in the range from 15:1 to 1:2, in particular in the range from 10:1 to 1:1.5, particularly preferably in the range from 5:1 to 1:1. In one embodiment, the weight ratio of mineral constituent (calculated as dry component) to water is in the range from 3:1 to 1:20, in particular in the range from 1:1 to 1:10, particularly preferably from 2:3 to 1:5.

The determination of the dry component of the mineral constituent is carried out by drying the material to constant weight at 105° C. in a laboratory oven and measuring the resulting loss in weight on drying.

The water content of the suspension (determined by drying the suspension to constant weight at 105° C.) in the contacting of the mineral constituent with the polymeric dispersant is appropriately in the range from 25% by weight to 95% by weight, in particular in the range from 50% by weight to 90% by weight, particularly preferably 60% by weight to 80% by weight.

If desired, the process can be carried out with addition of portland cement, portland cement clinker and/or a latent hydraulic binder, with the proportion by mass of portland cement, portland cement clinker and/or latent hydraulic binder, based on the sum of the amount of mineral constituent, being from 0.01 to 10% by weight, preferably from 0.01 to 5% by weight. The addition can be carried out before contacting with the polymeric dispersant, or after mechanical comminution of the mineral constituent.

In preferred embodiments, the process is carried out essentially without addition of other constituents and in particular essentially without addition of portland cement, portland cement clinker and/or ettringite.

The contacting of the mineral constituent with the polymeric dispersant is carried out with introduction of kinetic energy, for example by mixing or milling. Virtually all devices known to a person skilled in the art are suitable for this purpose.

For the purposes of the present invention, mixing is blending or homogenization which intensifies contact of the components to be mixed and thus allows uniform and/or rapid formation of the desired product.

Methods which effect mixing are, for example, stirring, shaking, injection of gases or liquids and irradiation with ultrasound. Suitable methods and apparatuses which bring about mixing are known to a person skilled in the art. Suitable mixing apparatuses are, for example, stirred vessels, dynamic and static mixers, single-shaft stirring apparatuses, for example stirring apparatuses with scraping devices, in particular paste stirring apparatuses, multishaft stirring apparatuses, in particular PDSM mixers, solids mixers and mixing/kneading reactors.

In a preferred embodiment, contacting takes place with introduction of shearing energy, with more than 50 kWh, in particular more than 200 kWh, preferably more than 400 kWh, especially from 100 to 5000 kWh, in particular from 200 to 3000 kWh, particularly preferably from 300 to 1000 kWh, of shearing energy being introduced per metric ton of the composition.

The shearing energy is defined as the effective work WW which can be calculated from the shearing power PW applied for milling and the milling time t according to the following equation (1):

$$W_W = P_W \cdot t \qquad \text{Equation (1):}$$

The shearing power which acts on the suspension can be calculated from the difference between effective power $P_P$ (power uptake of the apparatus during milling of the suspension) and the null power $P_0$ (power uptake of the apparatus running empty without suspension and if applicable without milling media, e.g. in the case of a bead mill, ball mill or toothed colloid mill) by means of the following equation (2):

$$P_W = P_P - P_0 \qquad \text{Equation (2):}$$

The null power (equation (3a)) or the effective power (equation (3b)) can be calculated from the effective voltage U and the effective current I, which is measured by means of a current measuring instrument on the apparatus in operation:

$$P_0 = U_0 \cdot I_0 \cdot \cos \varphi; \cos \varphi = 1 \qquad \text{Equation (3a):}$$

$$P_P = U_P \cdot I_P \cdot \cos \varphi; \cos \varphi = 1 \qquad \text{Equation (3b):}$$

The ratio of effective power $P_P$ to apparent power $P_S$ of the apparatus is described by $\cos \varphi$ according to equation (4):

$$\cos \varphi = P_P/P_S \qquad \text{Equation (4):}$$

Since the apparent power is very apparatus-specific and the effective power can be measured easily (by measuring the effective voltage and the effective current), $\cos \varphi = 1$ is assumed in the interests of simplicity.

Preference is therefore given to processes which introduce a high shearing energy. The process of the invention is therefore particularly preferably carried out for at least part of the time using an apparatus from the group consisting of mills, ultrasonic apparatuses, rotor-stator mixers (e.g. IKA Ultra-Turrax) and high-speed mixers. In particular, the introduction of shearing energy can be carried out by milling, for example in a toothed colloid mill, bead mill, ball mill or preferably stirred ball mill. The stirred ball mill comprises a milling chamber in which the milling media are present, a stator and a rotor which are arranged in the milling chamber. Furthermore, the stirred ball mill preferably comprises an inlet opening for material being milled and an outlet opening for material being milled to effect introduction and discharge of material being milled into or from the milling chamber, and also a milling media separation device which is arranged upstream of the outlet opening in the milling chamber and serves to separate milling media carried with the material being milled from the material being milled before the latter is discharged from the milling space through the outlet opening.

In order to increase the mechanical milling power introduced into the material being milled in the milling chamber, pins which project into the milling space are preferably present on the rotor and/or on the stator. During operation, a contribution to the milling power is thus firstly produced directly by impacts between the material being milled and the pins. Secondly, a further contribution to the milling power is produced indirectly by impacts between the pins and the milling media entrained in the material to be milled and the subsequent impacts between the material being milled and the milling media. Finally, shear forces and tensile forces acting on the material being milled also contribute to comminution of the suspended particles of the material being milled.

In one embodiment, the contacting with the polymeric dispersant is carried out in two stages. In the first stage, contacting is carried out until the particle size d(99) of the mineral constituent is ≤300 μm and in particular is in the range from 0.5 to 300 μm. This can be carried out using an apparatus selected from among a milling apparatus, an ultrasonic apparatus, a rotor-stator mixing system and a high-speed mixer disk.

In the second stage, contacting is carried out until the mineral constituent has a d(50) particle size of ≤800 nm, preferably ≤400 nm, particularly preferably ≤300 nm, determined by means of static light scattering. This is, in particular, carried out using a milling apparatus.

It has been found to be advantageous for a rest time of the suspension of from 0.01 hour to 48 hours, preferably from 4 hours to 24 hours, particularly preferably from 6 hours to 16 hours, to be observed before the introduction of kinetic energy, during which time the suspension rests or is stirred in order to prevent sedimentation in a stirred vessel without action of high shearing energy, i.e. shearing energies of <50 kWh per metric ton of suspension. When the contacting with the polymeric dispersant is carried out in two stages, the rest time can be implement before the first stage or between the two stages.

Before, during or after contacting of the mineral constituent with the dispersant, an acidic compound having a molecular weight of not more than 200 g/mol, in particular 40-100 g/mol, can be added. The addition of acidic compound is preferably carried out after contacting of the mineral constituent with the dispersant has occcured. The acidic compound is, for example, selected from among nitric acid, sulfamic acid, methanesulfonic acid, formic acid, acetic acid, sulfuric acid and mixtures thereof, preferably sulfamic acid, methanesulfonic acid, acetic acid and mixtures thereof. The amount of the acidic compound is appropriately selected so that a pH of the suspension of 11.0-13.0, preferably 11.4-12.5, particularly preferably 11.8-12.4, is obtained immediately after the addition of acid (10 to 60 seconds) or after complete homogenization.

Building Material Mixture

The invention also provides a building material mixture comprising the composition according to the invention comprising calcium silicate hydrate and optionally a hydraulic binder or latent hydraulic binder, in particular portland cement, slag, preferably granulated blast furnace slag, flyash, silica flour, metakaolin, natural pozzolanas, calcined oil shale, calcium sulfoaluminate cements and/or calcium aluminate cements.

The building material mixture of the invention can also comprise further additives which are typically used in the field of building chemicals, for example other curing accelerators, dispersants, plasticizers, water reducers, setting retarders, antifoams, air pore formers, retarders, shrinkage-reducing agents, redispersible powders, freezing protection agents and/or antiefflorescence agents.

Suitable other curing accelerators are alkanolamines, preferably triisopropanolamine and/or tetrahydroxyethylethylenediamine (THEED). The alkanolamines are preferably used in an added amount of from 0.01 to 2.5% by weight, based on the weight of the hydraulic binder. When amines, in particular triisopropanolamine and tetrahydroxyethylenediamine, are used, synergistic effects can be found in respect of the early strength development of hydraulic binder systems, in particular cement-like systems.

Further suitable other curing accelerators are, for example, calcium chloride, calcium formate, calcium nitrate, inorganic carbonates (e.g. sodium carbonate, potassium carbonate), 1,3-dioxolan-2-one and 4-methyl-1,3-dioxolan-2-one. Preference is given to using calcium formate and calcium nitrate in an amount of from 0.1 to 4% by mass based on the hydraulic binder.

Suitable dispersants, plasticizers, water reducers are, for example:

a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) nonionic copolymers for lengthening the processability of a cement-based mixture comprising cement and water, where the copolymer comprises units derived from at least one of the following monomer components: component A, namely an ethylenically unsaturated carboxylic ester monomer having a unit which can be hydrolyzed in the cement-based mixture; and component B, namely an ethylenically unsaturated carboxylic ester monomer or alkenyl ether monomer comprising at least one poly-$C_{2-4}$-oxyalkylene side chain having from 1 to 350 oxyalkylene units, or g) dispersants which comprise phosphonate groups and have the formula R—(OA)$_n$-N—[CH$_2$—PO(OM$_2$)$_2$]$_2$, where R is H or a saturated or unsaturated hydrocarbon radical, preferably a $C_1$-$C_{15}$-alkyl radical;

the radicals A can be identical or different and are alkylenes having from 2 to 18 carbon atoms, preferably ethylene and/or propylene, in particular ethylene;

n is from 5 to 500, preferably from 10 to 200, in particular from 10 to 100, and M is H, an alkali metal, 1/2 alkaline earth metal and/or an amine, with every combination of the abovementioned dispersants a) to g) being encompassed.

Suitable setting retarders are citric acid, tartaric acid, gluconic acid, phosphonic acid, aminotrimethylenephosphonic acid, ethylenediaminotetra(methylenephosphonic) acid, diethylenetriaminopenta(methylenephosphonic) acid, in each case including the respective salts of the acids, pyrophosphates, pentaborates, metaborates and/or sugars (e.g. glucose, molasses). The advantage of the addition of setting retarders is that the open time can be controlled and in particular may be able to be extended. The setting retarders are preferably used in an amount of from 0.01% by weight to 0.5% by weight, based on the weight of the hydraulic binder, preferably cement.

The composition comprising calcium silicate hydrate displays, in particular, a surprisingly strong accelerating effect on the curing of hydraulic binders or latent hydraulic binders, in particular portland cement. The use of the composition comprising calcium silicate hydrate makes it possible to improve the early strength of the hydraulically or latently hydraulically setting binders, in particular portland cement. Furthermore, the composition has improved use properties, e.g. a low viscosity in the concentration ranges relevant to the use. It is therefore easy to handle and allows easy pumping and spraying.

The invention further provides for the use of the compositions according to the invention for accelerating the curing of building chemical mixtures comprising a hydraulic or latent hydraulic binder, in particular cement, slag, preferably granulated blast furnace slag, flyash, silica flour, metakaolin, natural pozzolanas, calcined oil shale, calcium sulfoaluminate cements and/or calcium aluminate cements, preferably of building chemical mixtures comprising predominantly cement as hydraulic binder.

The compositions of the invention are preferably added in amounts of from 0.01% by weight to 15% by weight, preferably from 0.1% by weight to 10% by weight, particularly preferably from 0.1% by weight to 5% by weight, of the solid of the compositions, based on the hydraulic or latent hydraulic binder.

The invention will be illustrated by the accompanying drawings and the following examples.

FIG. 1 shows X-ray diffraction spectra of samples comprising (i) crystalline tobermorite 14 Å (crystallite size 50 nm), (ii) amorphous calcium silicate hydrate (tobermorite 14 Å; crystallite size 0.5 nm) and an X-ray diffraction spectrum of a semi-ordered calcium silicate hydrate which is suitable for the purposes of the invention (htCSH3) after Rietveld analysis.

Figure 2:
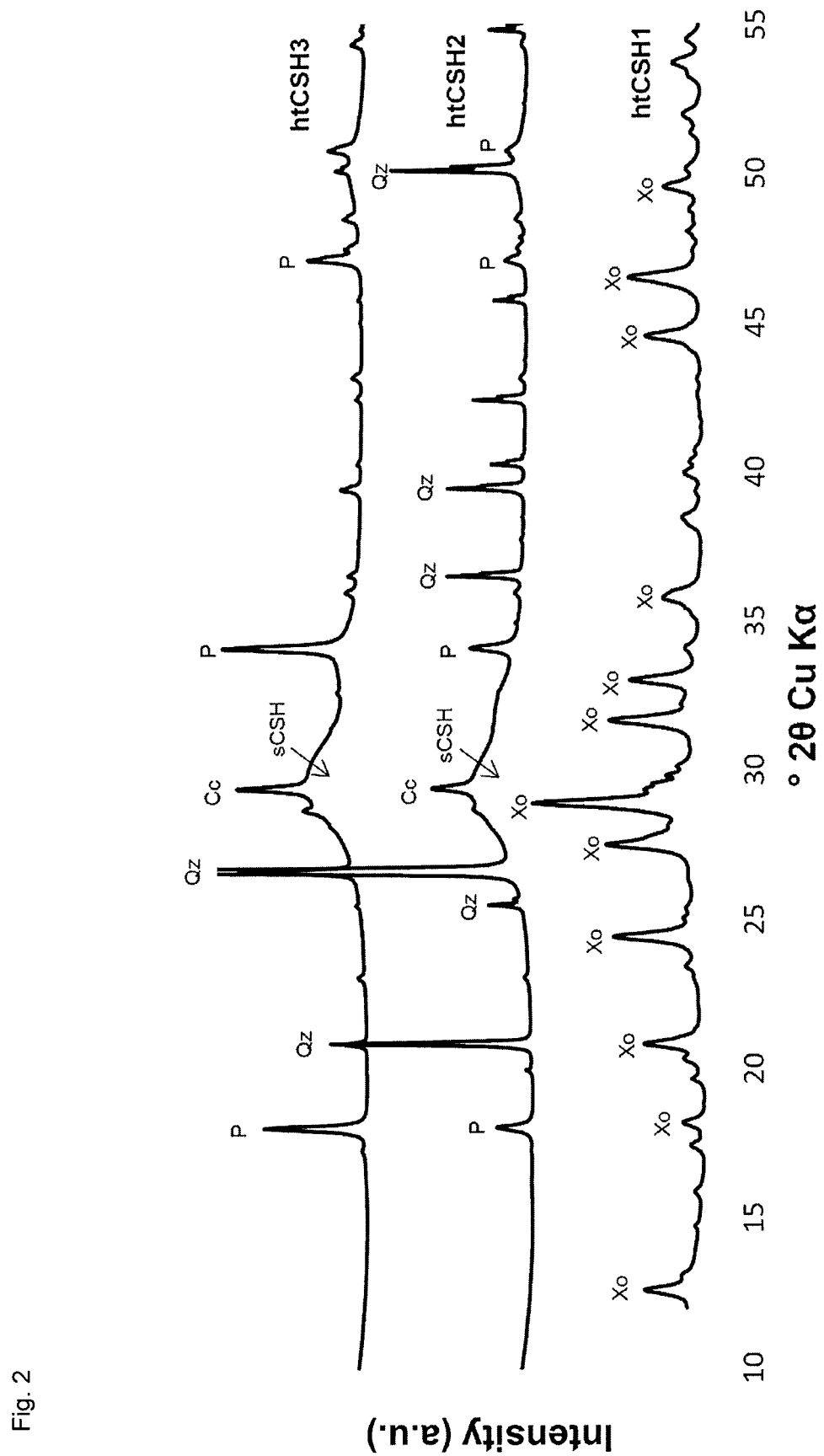

FIG. 2 shows X-ray diffraction spectra of a hydrothermal calcium silicate hydrate (htCSH1, comparison) and two semi-orderedr calcium silicate hydrates (htCSH2 and htCSH3) suitable for the purposes of the invention.

The distinguishable peaks or maxima were assigned to the phases; the abbreviations have the following meanings:
P—portlandite
Cc—calcite
Qz—alpha-quartz
T—tobermorite 14 Å
sCSH—semi-ordered calcium silicate hydrate
aCSH—amorphous calcium silicate hydrate
Xo—xonotlite As can be seen from FIG. 1, crystalline tobermorite displays a well-resolved spectrum with sharp peaks; no maxima which can be assigned to a crystalline calcium silicate hydrate phase are present in the spectrum of the amorphous calcium silicate hydrate. The contribution of the amorphous calcium silicate hydrate to the X-ray diffraction spectrum can be seen as an increased background, in particular in the 2θ range from 25° to 35° (Cu Kα). The semi-ordered calcium silicate hydrate which is suitable for the purposes of the invention displays a broadening and superimposition of the tobermorite maxima around 2θ=30°; the individual peaks are no longer resolved.

As can be seen in FIG. 2, the hydrothermal calcium silicate hydrate htCSH1 displays a well-resolved spectrum with sharp xonotlite peaks. The semi-ordered calcium silicate hydrates htCSH2 and htCSH3 which are suitable for the purposes of the invention display broad maxima around 2θ=30°.

EXAMPLES

Methods of Determination (i) Particle size of the raw material (mineral constituent)

The particle size of the raw material for wet milling was characterized by means of static light scattering. The Mastersizer 2000 instrument from Malvern was used for this purpose.

(ii) Determination of the specific surface area by the BET method

The specific BET surface area of the raw material for wet milling was determined by means of nitrogen adsorption. The "NOVA 4000e Surface Area and Pore Size Analyzer" instrument from Quantachrome was used for this purpose. For the measurements, the samples were dried beforehand to constant weight at 105° C.

(iii) X-ray diffraction analysis (XRD) and Rietveld analysis for determination of the proportion of X-ray-amorphous material in and the crystallite size of the calcium silicate hydrate:

The XRDs were recorded using a Bruker AXS D4 ENDEAVOR ($CuK_\alpha$ radiation, 40 kV, 40 mA) and the Rietveld measurements were carried out using the Topas 4.2 software from Bruker.

For the XRD analysis, the hydrothermal C-S-H from the autoclave process was comminuted by means of a jaw crusher and opposed impingement mill to a particle size having a d(95) of ≤1 mm. 5 g of the powder were subsequently dried at 105° C. for 1 hour in a laboratory oven.

For the XRD analysis, 2 g of the dried powder was in each case comminuted in an agate mortar until the sample could be brushed in its entirety through a sieve having a mesh opening of 36 µm.

The sample for determining the proportion of the X-ray-amorphous phase was a homogeneously mixed powder which comprised the sample and a known amount of an internal crystalline standard. For these studies, from 15% by mass to 30% by mass of fluorite ($CaF_2$) were triturated homogeneously with the sample (particle size <36 µm) in an agate mortar. The homogenized powder, which comprises fluorite as internal standard, was subsequently prepared and measured by means of "front loading". A prerequisite for the use of fluorite as internal standard is that fluorite is not present in the original sample. It is necessary to select a standard having a mass attenuation coefficient (MAC) which is similar to that of the sample in order to minimize the X-ray adsorption contrast. The samples have an MAC for Cu $K_\alpha$ radiation in the range from 75 to 80 $cm^2/g$. For this reason, $CaF_2$ having an MAC of 94.96 $cm^2/g$ was selected. The scientific literature recommends an amount of internal standard of about 20% by mass for an amorphous content in the range from 30 to 90% in the sample to be measured (Scrivener, Snellings, and Lothenbach. "Chapter 4. X-Ray Powder Diffraction Applied to Cement." *A Practical Guide to Microstructural Analysis of Cementitious Materials.* CRC/Taylor & Francis Group, 2016. 107-176). The samples examined comprise from 10% by mass to 70% by mass of X-ray-amorphous or nanocrystalline phases having crystallite sizes of <5 nm, so that 15% by mass and 30% by mass of internal standard were used.

The X-ray diffraction patterns (diffractograms) recorded by means of X-ray diffraction analysis were subsequently evaluated by means of Rietveld analysis using the software Topas 4.0. The Rietveld method is a standard method for evaluating diffraction patterns obtained by X-ray diffraction analysis of powder samples. The method is comprehensively described in, for example, G. Will (2006): Powder Diffraction—The Rietveld method and the two-stage method, Springer Verlag, and R. Young (1995): The Rietveld method, IUCr Monographs on Crystallography, vol. 5, Oxford University Press.

The following structural data from the Inorganic Crystal Structure Database (ICSD) were used for the Rietveld analysis of the present samples:

Tobermorite (mineral of the calcium silicate hydrates): ICSD number 152489

Calcite: ICSD number 79674

Quartz: ICSD number 174

Portlandite: ICSD number 15471

Fluorite: ICSD number 60368

The phase content of the individual phases and also the crystallite size of the calcium silicate hydrate phase tobermorite were determined by means of Rietveld analysis. The crystallite size is indicated by the width at half height of the reflections of a phase and is determined in the refinement during the Rietveld analysis. The relationship between width at half height of a reflection in the diffraction pattern and the crystallite size is described, for example, in chapter 5.4.1, page 142 onwards, in R. Dinnebier, S. Billinge (2008): Powder Diffraction—Theory and Practice, RSC Publishing, and on page 113 in G. Will (2006): Powder Diffraction—The Rietveld method and the two-stage method, Springer Verlag, and also R. Young (1995): The Rietveld method, IUCr Monographs on Crystallography, vol. 5, Oxford University Press.

The determination of the proportion of the X-ray-amorphous phase by means of an internal standard serves to quantify the absolute amount of the crystalline phases and the X-ray-amorphous phases and was carried out in accordance with the publication by I. Madsen, N. Scarlett and A. Kern, "Description and survey of methodologies for the determination of amorphous content via X-ray powder diffraction." *Zeitschrift für Kristallographie Crystalline Materials* 226.12 (2011): 944-955. Here, the known proportion of the internal standard is set down during the Rietveld refinement and the other phases are related thereto. The difference between the sum of the crystalline phases (tobermorite, calcite, quartz, portlandite, fluorite) and 100% by mass corresponds to the proportion of X-ray-amorphous material in the sample.

(iv) The charge density is determined by titration with poly-DADMAC (poly(diallyldimethylammonium chloride)) or sodium polyethylenesulfonate using a Mettler Toledo DL 28 titrator combined with a BTG Mütek particle charge detector.

(v) To determine the viscosity, the suspensions were stored in a closed vessel at room temperature for 24 hours after the end of milling. The viscosity was subsequently determined on a Brookfield viscometer DV-II+ at 12 rpm using spindle 62.

(vi) The determination of the weight average molecular weight of the polymeric dispersant was carried out by means of gel permeation chromatography (GPC) (column combinations: OH-Pak SB-G, OH-Pak SB 804 HQ and OH-Pak SB 802.5 HQ from Shodex, Japan; eluent: 80% by volume of aqueous solution of $HCO_2NH_4$ (0.05 mol/l) and 20% by volume of acetonitrile; injection volume 100 µl; flow rate 0.5 ml/min). Calibration for determining the average molar mass was carried out using linear poly(ethylene oxide) and polyethylene glycol standards.

Preparation of Polymeric Dispersants:

Polymers 1, 2 and 7

875 g of a 40% strength aqueous solution of polyethylene glycol hydroxybutyl monovinyl ether and NaOH (20%) are placed in a 1 liter four-neck flask provided with thermometer, reflux condensor and a connection for two feed streams. Details of the molar masses of the respective polyethylene glycol hydroxybutyl monovinyl ether may be found in table 2. The solution is then cooled to 20° C. Acrylic acid (99%) is then slowly added to the polyethylene glycol hydroxybutyl monovinyl ether solution in the initially charged flask. This decreases the pH to about 4-5. 0.5 g of iron(II) sulfate heptahydrate and 5 g of rongalite and mercaptoethanol are subsequently added. After these have been stirred in briefly, 3 g of 50% strength hydrogen peroxide are also introduced. The temperature increases from 20° C. to about 30° C.-65° C. as a result. The solution is subsequently stirred for 10 minutes before being neutralized with sodium hydroxide solution (20%). This gives a light-yellow, clear aqueous polymer solution having a solids content of about 40% by weight. The amounts of the chemicals used (NaOH, mercaptoethanol and acrylic acid) and the molar masses of the respective polyethylene glycol hydroxybutyl monovinyl ether (PEG-HBVE), weight average molar masses and the charge density of the polymer (number of mol of carboxylate and/or carboxyl groups/total molar mass of the PCE) (mol/(g/mol)) may be found in tables 1 and 2 below.

TABLE 1

Details of the preparation of P1, P2 and P7

| Polymer | NaOH (20%) [g] | Mercaptoethanol [g] | Acrylic acid (99%) [g] |
|---|---|---|---|
| P1 | 40 | 1.5 | 30.8 |
| P2 | 10 | 1.7 | 42.4 |
| P7 | 0 | 0.9 | 21.9 |

TABLE 2

Overview of the structural parameters of the polymers

| Polymer | Charge density (µeq/g) | $M_w$ (g/mol) | Molar mass of PEG-HBVE (g/mol) |
|---|---|---|---|
| P1 | 1110 | 28 537 | 5800 |
| P2 | 1488 | 28 659 | 3000 |
| P7 | 811 | 35 665 | 5800 |

Polymer P3

The polymer P3 is a comb polymer and is based on the monomers maleic acid, acrylic acid and vinyloxybutylpolyethylene glycol—5800. The molar ratio of acrylic acid to maleic acid is 7. The molecular weight $M_W$ is 40 000 g/mol and was determined by GPC. The solids content is 45% by weight. The synthesis is, for example, described in EP 0894811. The charge density is 930 µeq/g.

Polymer P4

The polymer P4 is a condensate of the building blocks phenolPEG5000, phenoxyethanol phosphate and formaldehyde. The molecular weight $M_W$ is 25 730 g/mol. The polymer was prepared in a manner analogous to polymer 7 of WO 2015/091461 (table 1 and 2).

Polymer P5

The polymer P5 is a comb polymer polymerized from a hydroxyethyl methacrylate phosphate and an ester of methacrylic acid and methylpolyethylene glycol having a molecular weight of 5000 g/mol. The synthesis was carried out in a manner analogous to the preparation of P1 in WO 2014/026938. The molecular weight $M_W$ is 3660 g/mol. The solids content of the polymer solution is 29% by mass.

Polymer P6

The polymer 6 is a commercially available polyacrylate which has been partially neutralized with NaOH (degree of neutralization 80%). The average molecular weight $M_W$ is 5000-10 000 g/mol. The solids content of the polymer solution is 45% by mass.

Hydrothermal calcium silicate hydrate (htCSH)

htCSH1: Circolit, obtainable from Cirkel GmbH & Co. KG, Haltern am See.

htCSH2:

For the production of htCSH2, 153 kg of quartz flour (d(95) <63 µm, $SiO_2$ content >95% by mass), 150 kg of quicklime (d(95) <90 µm, CaO content >90% by mass), 222 g of aluminum paste (water content=40%, d(50)=15 µm) and 340 kg of water were mixed. This suspension was allowed to stand for 3 hours at a temperature of 20° C. The material was subsequently maintained at 150° C. in an autoclave (about 5 bar) for 8 hours. The material was then cooled to room temperature and comminuted further by means of crushers and ball mills to a particle size d(95) <1 mm and d(50) <500 µm. The moisture content (determined by drying to constant weight at 105° C.) was 36.6% by mass.

htCSH3:

For the production of htCSH3, 100 kg of quartz flour (d(95) <63 µm, $SiO_2$ content >95% by mass), 200 kg of quicklime (d(95) <90 µm, CaO content >90% by mass), 222 g of aluminum paste (water content=40%, d(50)=15 µm) and 410 kg of water were mixed. This suspension was allowed to stand for 3 hours at a temperature of 20° C. The material was subsequently maintained at 170° C. in an autoclave (about 8 bar) for 12 hours. The material was then cooled to room temperature and comminuted further by means of crushers and ball mills to a particle size d(95) <1 mm and d(50) <500 µm. The moisture content (determined by drying to constant weight at 105° C.) was 40.0% by mass.

The starting materials used have the following properties (table 3):

TABLE 3

| Type | htCSH1 | htCSH2 | htCSH3 |
|---|---|---|---|
| Composition (in % by mass)[1] C-S-H component | | | |
| C-S-H phase | Xonotlite | Tobermorite 14Å (C-S-H phase used as basis) | Tobermorite 14Å (C-S-H phase used as basis) |
| | 84.5 | 14.6 | 23.3 |
| Proportion of X-ray-amorphous material | 12.5. | 51.1 | 60.6 |
| Crystalline foreign component | | | |
| Quartz | n.d. | 27.3 | 4.5 |
| Portlandite | n.d. | 2.6 | 7.0 |
| Calcite | 3.0 | 2.7 | 4.6 |
| Properties | | | |
| Crystallite size of C-S-H phase | 33 nm | 3.6 nm | 3.6 nm |
| Particle size distribution | | | |
| d(10) in µm | 1 | 7 | 6 |
| d(50) in µm | 7 | 101 | 109 |
| d(90) in µm | 21 | 217 | 227 |
| BET surface area | 38 cm²/g | 113 cm²/g | 113 cm²/g |
| Molar ratio of Ca/Si[3] | 1.09* | 0.89[2] | 1.77[2] | n.d.: not determinable (content is less than the detection limit)
*determined from product data sheets
[1]from XRD with subsequent Rietveld analysis
[2]determined by means of X-ray fluorescence analysis (XRF)
[3]from the total amount of the inorganic constituents of the hydrothermal CSH The wet milling of the hydrothermally produced calcium silicate hydrate was carried out by means of a shaking setup (shaker SK 300 from Fast & Fluid Management). The conditions for the individual wet millings are listed in table 4. For milling, 100 g of the suspension corresponding to the parameters in table 4 were introduced into 250 ml glass bottles filled with 500 g of milling beads composed of $ZrO_2$ and having a diameter of 1 mm. Milling took place on setting 3 at an effective power $I_0$ of 1281.1 W. Between the production of the suspensions (mixing of hydrothermal C-S-H, water and water-soluble polymer) and the actual wet milling with high shearing energy, the suspension was allowed to rest for 30 minutes without additional mechanical shearing action. After milling, the suspension was separated off from the milling beads by means of a sieve and in some cases rinsed with distilled water. The solids content of the suspension was subsequently determined by drying the suspension to constant weight at 60° C.

For comparison with the prior art, 3 suspensions were produced by precipitation as described in WO 2010/026155 (pptCSH). These comprise amorphous CSH nuclei which have been stabilized by the polymer.

Heat Flow Calorimetry:

To determine the accelerating power of the accelerator suspensions, cement pastes comprising the accelerator suspensions were produced and the hydration kinetics thereof were measured by means of isothermal heat flow calorimetry. For this purpose, 100 g of portland cement (CEM I 52.5 R) were mixed with 40 g of water by means of an overhead stirrer for 90 seconds at 500 rpm. The suspension to be tested

TABLE 4

| Example | Starting material | Content of hydrothermal CSH (% by mass) | Polymer | Polymer content (solid) in suspension (% by mass) | Solids content after milling [1] (% by mass) | Milling time (min) | Shearing energy (kWh/t) |
|---|---|---|---|---|---|---|---|
| S1* | htCSH1 | 15 | — | — | 15.26 | 180 | 604 |
| S2* | htCSH1 | 15 | P4 | 2.5 | 17.67 | 180 | 604 |
| S3* | htCSH1 | 15 | P1 | 2.5 | 17.63 | 180 | 604 |
| S4* | htCSH1 | 15 | P3 | 2.5 | 17.69 | 180 | 604 |
| S5* | htCSH1 | 15 | P6 | 2.5 | 17.48 | 180 | 604 |
| S6* | htCSH1 | 15 | P5 | 2.5 | 17.73 | 180 | 604 |
| S7 | htCSH2 | 15 | P1 | 2.5 | 11.22 | 180 | 604 |
| S8 | htCSH2 | 15 | P1 | 3.5 | 12.38 | 180 | 604 |
| S9 | htCSH2 | 15 | P1 | 7.5 | 15.79 | 180 | 604 |
| S10 | htCSH3 | 15 | P1 | 2.5 | 11.56 | 180 | 604 |
| S11 | htCSH3 | 15 | P1 | 3.5 | 12.70 | 180 | 604 |
| S12 | htCSH3 | 15 | P1 | 7.5 | 16.27 | 180 | 604 |
| S13 | htCSH3 | 13.91 | P7 | 2.8 | 15.22 | 20 | 67 |
| S14 | htCSH3 | 13.91 | P7 | 2.8 | 16.72 | 60 | 201 |
| S15 | htCSH3 | 13.91 | P7 | 2.8 | 16.86 | 120 | 402 |
| S16* | pptCSH | — | P7 | 2.8 | 17.92[2] | 20 | 67 |
| S17* | pptCSH | — | P7 | 2.8 | 18.01[2] | 60 | 201 |
| S18* | pptCSH | — | P7 | 2.8 | 18.22[2] | 120 | 402 |

[1] The solids content of the suspension after milling was determined by drying 1 g of suspension to constant weight at 60° C. in a drying oven.
[2] The samples were diluted with water to a solids content of 15% by mass before the viscosity measurement.
*comparative example.

For comparison with the prior art as setforth in WO 2010/026155, 3 suspensions (S16, S17, S18) and 3 suspensions according to the invention (S13, S14, S15) were produced, with 194 g of suspension being milled in the 250 ml bottles with an amount of milling media of 500 g in examples S13 to S18.

For the production of S16 to S18, 15.5 g of Ca(OH)$_2$ (Merck, CAS 1305-62-0, purity>97%) and 12.1 g of SiO$_2$ (Silica, fumed; CAS 112945-52-5, Sigma Aldrich, purity>99.9%) were mixed with water and polymer (see table 2 above) so that the total amount of the suspension was 194 g.

To determine the shearing energy, the current in empty operation I$_0$ (shaking motion without milling beads and material being milled) and the current in milling operation I$_P$ (shaking motion with glass bottles filled with milling beads and material being milled) were measured during operation of the shaker SK 300 by means of an AC multimeter clamp MX 350 from Metrix. The effective voltage was in both cases 230 V.

The effective power I$_0$ derived from the measured currents was 1281.1 W, while the effective power in milling operation I$_P$ for the milling of 400 g of suspension was 1361.6 W. This gives a required effective power P$_W$ of 201.25 W for the milling of 1 kg of suspension.

The polymer content in the suspension is always based on the solids content of the polymer used.

The suspensions were characterized in respect of the accelerating effect by means of heat flow calorimetry and in respect of viscosity by means of a Brookfield viscometer.

was added together with the mixing water to the cement, with the amount of mixing water then being corrected to take account of the amount of water comprised in the suspension, so that a water-cement value of 0.4 was set in each experiment. The added amounts of the suspension to be tested are shown in table 5.

6 g in each case of mortar or cement paste were then introduced into the measuring vessel and this was inserted into the calorimeter. The isothermal heat flow calorimetry was carried out using a TAMAir calorimeter from TA Instruments at 20° C.

The cumulative heat of hydration after 6 hours was determined. Furthermore, for comparison of the samples, the maximum gradients in the heat flow between 2 and 8 hours were determined in each case and these were expressed as a ratio to the gradient of the comparator measurement (cement+water). The determination of the relative gradient was carried out as described in the publication by L. Nicoleau (2012) (L. Nicoleau: The acceleration of cement hydration by seeding: Influence of the cement mineralogy. Ibausil 18th International Building Material Conference in Weimar (2012), conference proceedings pages 1-0330-1-0337). The results of the calorimetric measurements are set forth in table 5 below:

The results are shown in table 5.

TABLE 5

| Accelerator suspension | Viscosity suspension (mPas) | Amount of suspension added, based on cement (% by mass) | Amount of CSH starting material added, based on cement | HoH after 6 hours [J/g of cement] | Acceleration factor |
|---|---|---|---|---|---|
| Without | — | | | 23.25 | 1.00 |
| S1 | >100 000 | 3.28 | 0.5% by mass | 38.08 | 1.11 |
| S1 | >100 000 | 6.55 | 1.0% by mass | 46.89 | 1.11 |
| S2 | 85 | 3.30 | 0.5% by mass | 41.52 | 1.30 |
| S2 | 85 | 6.60 | 1.0% by mass | 49.83 | 1.54 |
| S3 | 30 | 3.31 | 0.5% by mass | 42.07 | 1.39 |
| S3 | 30 | 6.62 | 1.0% by mass | 53.18 | 1.83 |
| S4 | 20 | 3.30 | 0.5% by mass | 41.82 | 1.37 |
| S4 | 20 | 6.60 | 1.0% by mass | 51.87 | 1.65 |
| S5 | 3 | 3.34 | 0.5% by mass | 33.41 | 1.35 |
| S5 | 3 | 6.68 | 1.0% by mass | 36.38 | 1.61 |
| S6 | 7.5 | 3.29 | 0.5% by mass | 33.83 | 1.20 |
| S6 | 7.5 | 6.58 | 1.0% by mass | 41.04 | 1.41 |
| S7 | 10 | 5.20 | 0.5% by mass | 48.32 | 1.85 |
| S7 | 10 | 10.40 | 1.0% by mass | 59.95 | 2.37 |
| S8 | 20 | 4.98 | 0.5% by mass | 44.66 | 1.87 |
| S8 | 20 | 9.96 | 1.0% by mass | 54.99 | 2.26 |
| S9 | 30 | 4.75 | 0.5% by mass | 33.32 | 1.50 |
| S9 | 30 | 9.50 | 1.0% by mass | 36.27 | 1.70 |
| S10 | 15 | 5.05 | 0.5% by mass | 57.74 | 2.13 |
| S10 | 15 | 10.09 | 1.0% by mass | 69.02 | 2.70 |
| S11 | 15 | 4.85 | 0.5% by mass | 55.01 | 2.22 |
| S11 | 15 | 9.71 | 1.0% by mass | 67.23 | 2.65 |
| S12 | 20 | 4.61 | 0.5% by mass | 41.01 | 2.26 |
| S12 | 20 | 9.22 | 1.0% by mass | 45.66 | 2.52 |
| S13 | 18 | 9.86 | 1.25% by mass | 51.30 | 1.42 |
| S14 | 20 | 8.97 | 1.25% by mass | 59.42 | 1.67 |
| S15 | 35 | 8.90 | 1.25% by mass | 65.31 | 1.79 |
| S16 | >100 000 | 8.37 | 1.25% by mass | 64.91 | 1.65 |
| S17 | >100 000 | 8.33 | 1.25% by mass | 68.95 | 1.80 |
| S18 | >100 000 | 8.23 | 1.25% by mass | 66.58 | 1.69 |

HoH: cumulative heat of hydration from 0.5 hours of hydration onward.

A viscosity of >100 000 means that the viscosity was not measurable because a solid gel has been formed.

The invention claimed is:

1. A composition, comprising a mineral constituent and a polymeric water-soluble dispersant, wherein the mineral constituent comprises a semi-ordered calcium silicate hydrate having an apparent crystallite size of 15 nm or less and less than 35% by weight of crystalline phases other than the semi-ordered calcium silicate hydrate.

2. The composition of claim 1, wherein a molar ratio of calcium to silicon in the mineral constituent is in a range of from 0.5 to 2.5.

3. The composition of claim 1, comprising 2% by weight or less of alkali metals, based on the mineral constituent.

4. The composition of claim 1, wherein a specific BET surface area of the mineral constituent is in a range of from 30 to 150 m$^2$/g, determined in accordance with DIN ISO 9277:2003-05.

5. A process for producing a composition comprising calcium silicate hydrate, the process comprising contacting a mineral constituent with at least one water-soluble polymeric dispersant in an aqueous medium by introducing kinetic energy, where the mineral constituent comprises a semi-ordered calcium silicate hydrate having an apparent crystallite size of 15 nm or less and less than 35% by weight of crystalline phases other than the semi-ordered calcium silicate hydrate.

6. The process of claim 5, wherein the mineral constituent has been produced by reacting calcium oxide or calcium hydroxide with silicon dioxide in the presence of water under hydrothermal conditions at a temperature in a range of from 100° C. to 400 C for a period of from 5 hours to 30 hours.

7. The process of claim 6, wherein the mineral constituent has been produced in the presence of a foaming agent.

8. The process of claim 5, wherein the contacting of the mineral constituent with the at least one water-soluble polymeric dispersant is effected by introduction of mixing or shearing energy.

9. The process of claim 8, wherein the contacting of the mineral constituent with the water-soluble polymeric dispersant is effected by milling.

10. The process of claim 9, wherein the milling is carried out to a particle size d(50) of the mineral constituent of ≤400 nm, determined by static light scattering.

11. The process of claim 5, wherein a comb polymer having polyalkylene oxide side chains is used as a polymeric dispersant.

12. A building material mixture, comprising the composition of claim 1 and optionally a hydraulic binder or latent hydraulic binder.

13. A process of accelerating the curing of a building chemical mixture comprising a hydraulic binder or latent hydraulic binder, the process comprising adding the composition of claim 1 to the building chemical mixture.

14. The composition of claim 1, wherein the semi-ordered calcium silicate hydrate has a higher degree of order than amorphous calcium silicate hydrate and a lower degree of order than macroscopic crystalline calcium silicate hydrate.

15. The composition of claim 1, wherein the semi-ordered calcium silicate hydrate has a main diffraction peak with a half width at least 1.25 times the half width of a corresponding main diffraction peak of the crystalline form of calcium silicate hydrate with a crystallite size of 50 nm or larger.

16. A composition, comprising a mineral constituent and a polymeric water-soluble dispersant, wherein the mineral constituent comprises a semi-ordered calcium silicate hydrate having an apparent crystallite size of 15 nm or less and less than 35% by weight of crystalline phases other than the semi-ordered calcium silicate hydrate;
wherein the mineral constituent has a molar ratio of Ca to Si in the range of from 1.6 to 2.5.

17. The composition according to claim 16, wherein the composition is a curing accelerator for hydraulic binders or latent hydraulic binders.

* * * * *